United States Patent [19]

Paddison et al.

[11] 4,063,300
[45] Dec. 13, 1977

[54] PROTECTIVE RELAY ARRANGEMENTS

[75] Inventors: Eric Paddison, Stafford; Leonardo Perez-Cavero, Haughton, both of England; Christopher George Wilson, Melbourne, Australia

[73] Assignee: The General Electric Company Limited, London, England

[21] Appl. No.: 632,404

[22] Filed: Nov. 17, 1975

[30] Foreign Application Priority Data

Nov. 18, 1974 United Kingdom ............ 49733/74

[51] Int. Cl.² ............................................. H02H 3/26
[52] U.S. Cl. ..................................... 361/78; 361/79; 361/80; 361/84
[58] Field of Search ................. 317/27 R, 28 R, 29 R, 317/36 D; 361/78, 79, 80, 82, 84, 86, 87

[56] References Cited

U.S. PATENT DOCUMENTS

3,210,606 10/1965 Calhoun ............................ 317/36 D
3,303,390 2/1967 Sonnemann ...................... 317/36 D Primary Examiner—Harry E. Moose, Jr.
Attorney, Agent, or Firm—Kirschstein, Kirschstein, Ottinger & Frank

[57] ABSTRACT

A protective relay arrangement for an A.C. power system wherein the occurrence of a fault is detected by monitoring the phase or amplitude relation between at least one pair of signals which, when a fault occurs in the system, are functions of a current and/or voltage which would have occurred in the power system if the or each emf source in the system had a value equal to the pre-fault voltage at the point in the system where the fault has occurred.

18 Claims, 29 Drawing Figures

Fig.26  $V_O = V_A + K_3 I_A Z_R \angle \gamma - K_2 I_L Z_R \angle \beta$

PROTECTIVE RELAY ARRANGEMENTS

This invention relates to protective relay arrangements of A.C. power systems.

In such arrangements the occurrence of a fault which it is desired to protect the system against is detected by monitoring the phase or amplitude relation between one or more pairs of signals, the fault being assumed to have occurred when the relations being monitored attain predetermined values. In known arrangements the signals monitored are functions of the voltage and current at a particular point in the system referred to as the relaying point. Such known arrangements are of limited use because the signals compared are a function of the load current at the relaying point as well as the current due to the fault.

It is an object of the present invention to provide a protective relay arrangement wherein this difficulty is alleviated.

According to the present invention in a protective relay arrangement for an A.C. power system the occurrence of a fault is detected by monitoring the phase or amplitude relation between at least one pair of signals which, when a fault occurs in the system, are functions of a current and/or voltage which would have occurred in the power system if the or each emf source in the system had a value equal to the pre-fault voltage at the point in the system where the fault has occurred.

In a preferred arrangement in accordance with the invention each said signal is a function of a current $I_{AF}$ and/or a voltage $V_{AF}$ given by the expressions:

$$I_{AF} = I_A - I_L \text{ and}$$

$$V_{AF} = V_A - I_L Z_R$$

where:

$I_A$ is a current at the relaying point under fault conditions;

$I_L$ is a pre-fault current at the relaying point;

$V_A$ is a voltage at the relaying point; and $Z_R$ is an impedance replica of an impedance of a line section of the power system protected by the relay arrangement.

The invention will be more readily understood from the following description of preferred embodiments thereof taken in conjunction with the accompanying drawings in which.

Figure 1:
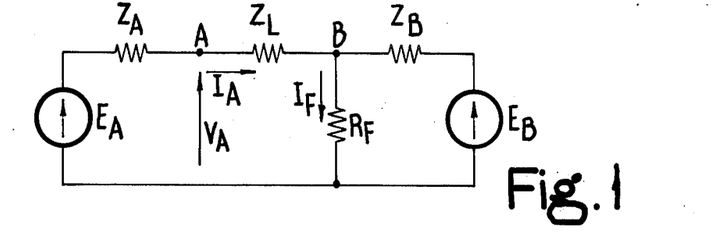
FIG. 1 is a circuit diagram of a power system to be protected.

Referring to FIG. 1, the system comprises a length of line connecting two sources of voltage $E_A$ and $E_B$, $Z_L$ representing the impedance of the line between a relaying point A and a point B at which a fault having a resistance $R_F$ exists. $Z_A$ represents the impedance up-line of the relaying point A and $Z_B$ represents the impedance down-line of the fault point B.

The voltage $V_A$ at the relaying point under fault conditions is given by the expression $$V_A = Z_L I_A + R_F I_F \tag{1}$$

where:

$I_A$ is the current at the relaying point under fault conditions; and $I_F$ is the current in the fault resistance $R_F$.

Figure 2:
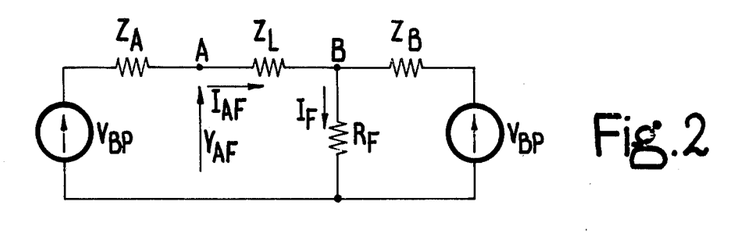
FIG. 2 is a diagram of the equivalent fault circuit of the system of FIG. 1.

By Thevenin's theorem the equivalent network shown in FIG. 2 can be derived for the current $I_F$ in the fault resistance $R_F$. In the equivalent network the source voltages $V_{BP}$ have a value equal to the pre-fault voltage at the fault point B and $V_{AF}$ and $I_{AF}$ represent the voltage and current respectively at the relaying point A.

The current $I_A$ at the relaying point under fault conditions may thus be expressed as follows:

$$I_A = I_{AF} + I_L \tag{2}$$

where $I_L$ represents the pre-fault current at the relaying point.

Hence:

$$I_{AF} = I_A - I_L \tag{3}$$

From FIG. 2 it can be seen that $$V_{AF} = I_{AF} Z_L + I_F R_F$$

$$V_{AF} = (I_A - I_L) Z_L + R_F I_F$$

Substituting $V_A - Z_L I_A$ for $R_F I_F$ from equation (1) gives $$V_{AF} = V_A - I_L Z_L \tag{4}$$

By using the quantities $V_{AF}$ and $I_{AF}$ for relaying purposes, instead of the conventionally used quantities $V_A$ and $I_A$, the errors caused by the pre-fault current $I_L$ when $V_A$ and $I_A$ are used are eliminated.

Table I below shows the input signals which are compared in conventional protective relay arrangements for a single-phase network, or a polyphase network under balanced conditions, (e.g. for detecting three-phase faults in a three-phase network), in order to obtain various desired characteristics. Such relay arrangements are described in a book entitled "Protective Relays — Their Theory and Practice" by A. C. R. Van Warrington published by Chapman and Hall, in particular on pages 234 to 252 of Volume II. In Table I the input signals are expressed as voltages but it will be appreciated that they could equally well be expressed as currents. However, for simplicity, the inputs are considered as voltages only. For simplicity, the amplitude comparator inputs are shown with $Z_{R2} = Z_{R1}$.

By replacing the quantities $V_A$ and $I_A$ in Table I by $V_{AF}$ and $I_{AF}$ respectively, and substituting the values for $V_{AF}$ and $I_{AF}$ obtained above in equations (3) and (4), the voltage inputs to obtain the corresponding characteristics in protective relay arrangements in accordance with the present invention are arrived at. Table II below shows these new inputs for a phase comparison angle $\lambda°$ of $\pm 90°$, and the corresponding amplitude comparator inputs.

TABLE I

Conventional Voltage Inputs for various protective relay characteristics

| Characteristic | Phase Comparator $S_1 S_2 \cos \theta > 0$ | | Amplitude Comparator $T_1 > T_2$ | |
|---|---|---|---|---|
| | Operating Input $S_1$ | Polarising Input $S_2$ | Operating Input $T_1$ | Restraining Input $T_2$ |
| Directional | $I_A Z_{R1}$ | $V_A$ | $\|I_A Z_{R1} + V_A\|$ | $\|I_A Z_{R1} - V_A\|$ |
| Angle Impedance (Ohm) | $V_A - I_A Z_{R1}$ | $I_A Z_{R2}$ | $\|2I_A Z_{R1} - V_A\|$ | $\|V_A\|$ |
| Reactance | $V_A - I_A X_{R1}$ | $I_A X_{R2}$ | $\|2I_A X_{R1} - V_A\|$ | $\|V_A\|$ |
| Impedance | $V_A - I_A Z_{R1}$ | $I_A Z_{R2} + V_A$ | $\|I_A Z_{R1}\|$ | $\|V_A\|$ |
| Angle Admittance (Mho) | $V_A - I_A Z_{R1}$ | $V_A$ | $\|I_A Z_{R1}\|$ | $\|2V_A - I_A Z_{R1}\|$ |
| Offset Mho | $V_A - I_A Z_{R1}$ | $V_A - I_A Z_{R2}$ | $\|I_A(Z_{R1} - Z_0)\|$ | $\|2V_A - I_A(Z_{R1} - Z_0)\|$ |

$I_A$ is the phase current at relaying point.
$V_A$ is the phase voltage at relaying point.
$Z_{R1}$ is an impedance replica of the positive sequence impedance of protected line section.
$Z_{R2}$ is an impedance replica having value $\leq Z_{R1}$.
$Z_0$ is an impedance replica required to offset Mho characteristic.
$X_{R1}$, $X_{R2}$, $X_0$ are the reactive components of $Z_{R1}$, $Z_{R2}$ and $Z_0$ respectively.
$\theta$ is the angle between $S_1$ and $S_2$.

TABLE II

Phase comparison angle $\pm \lambda$ where $\lambda = 90°$
New voltage inputs for various protective relay characteristics

| Characteristic | Operating Input $S_1$ | Phase Comparator $S_1 S_2 \cos\theta > 0$ Fig. No. $S_1$ | Polarising Input $S_2$ | Fig. No. $S_2$ | Operating Input $T_1$ | Amplitude Comparator $T_1 > T_2$ Fig. No. $T_1$ | Restraining Input $T_2$ | Fig. No. $T_2$ |
|---|---|---|---|---|---|---|---|---|
| Directional (1) | $(I_A-I_L)Z_{R1}$ | 3 | $(V_A-I_L Z_{RD})$ | 4 | $|(I_A-2I_L)Z_{R1}+V_A|$ | 9 | $|I_A Z_{R1}-V_A|$ | 6 |
| Directional (2) | $(I_A-I_L)Z_{R1}$ | 3 | $(V_A'-I_L Z_{R2})$ | 5 | $|(I_A-2I_L)Z_{R1}+V_A'|$ | 10 | $|I_A Z_{R1}-V_A'|$ | 13 |
| Angle Impedance (Ohm) | $(V_A-I_A Z_{R1})$ | 6 | $(I_A-I_L)Z_{R2}$ | 3 | $|(2I_A-I_L)Z_{R1}-V_A|$ | 14 | $|V_A-I_L Z_{R1}|$ | 4 |
| Reactance | $(V_A-I_A X_{R1})$ | 7 | $(I_A-I_L)X_{R2}$ | 8 | $|(2I_A-I_L)X_{R1}-V_A|$ | 15 | $|V_A-I_L X_{R1}|$ | 16 |
| Impedance (1) | $(V_A-I_A Z_{R1})$ | 6 | $V_A+(I_A-2I_L)Z_{R2}$ | 9 | $|(I_A-I_L)Z_{R1}|$ | 3 | $|V_A-I_L Z_{R1}|$ | 4 |
| Impedance (2) | $(V_A-I_A Z_{R1})$ | 6 | $V_A+(I_A-2I_L)Z_{R2}$ | 10 | $\left|\dfrac{(V_A+V_A')}{2} -I_L Z_{R1}\right|$ | 17 | | 18 |
| Angle Admittance (Mho) (1) | $(V_A-I_A Z_{R1})$ | 6 | $(V_A-I_L Z_{RD})$ | 4 | $|(I_A-I_L)Z_{R1}|$ | 3 | $|2V_A-(I_A+I_L)Z_{R1}|$ | 19 |
| Angle Admittance (Mho) (2) | $(V_A-I_A Z_{R1})$ | 6 | $(V_A'-I_L Z_{R2})$ | 5 | $|(V_A'-V_A)+(I_A-I_L)Z_{R1}|$ | 20 | $|V_A+V_A'-(I_A+I_L)Z_{R1}|$ | 21 |
| Offset Mho (1) | $(V_A-I_A Z_{R1})$ | 6 | $V_A-\left[I_A-I_L\dfrac{(Z_O-Z_{R2})}{Z_O}\right]Z_O$ | 11 | $|(I_A-I_L)(Z_{R1}-Z_O)|$ | 22 | $|2V_A-(I_A+I_L)Z_{R1}-(I_A-I_L)Z_O|$ | 23 |
| Offset Mho (2) | $(V_A-I_A Z_{R1})$ | 6 | $V_A'-\left[I_A-I_L\dfrac{(Z_O-Z_{R2})}{Z_O}\right]Z_O$ | 12 | $|(V_A'-V_A)+(I_A-I_L)(Z_{R1}-Z_O)|$ | 28 | $|V_A+V_A'-(I_A+I_L)Z_{R1}-(I_A-I_L)Z_O|$ | 25 |

$V_A'$ is the pre-fault voltage at the relaying point

In protective relay arrangements in accordance with the invention improved performance for directional, impedance, angle-admittance and offset mho characteristics can sometimes be obtained by using the pre-fault voltage at the relay point ($V_A'$) in place of $V_A$ in the polarising input of the phase comparator arrangements. A similar effect can be obtained by suitably modifying the inputs of amplitude comparator arrangements. Such modified inputs are also shown in Table II for the characteristics concerned, the suffixes (1) and (2) in the characteristic column designating normal and modified inputs respectively.

Table III below shows voltage inputs in accordance with the invention for a phase comparison angle $\pm \lambda$ where $\lambda \neq 90°$, such inputs producing so-called restricted characteristics. The inputs for the phase comparison arrangements in Table III are the same as in Table II. In the amplitude comparator arrangements constants $K_1$, $K_2$, and $K_3$ and angles $\angle \alpha$ $\angle \beta$ and $\angle \gamma$ are introduced to obtain shaped characteristics with the amplitude comparator arrangements similar to those obtained with the corresponding phase comparator arrangements.

In Table III the amplitude comparator inputs using pre-fault voltage for impedance, angle-admittance, and offset mho characteristics are not shown due to their complexity. Reactance characteristic input signals have been omitted from Table III since they are not applicable.

TABLE III

Phase comparison angle $\pm \lambda$ where $\lambda \neq 90°$
New voltage inputs for various restricted protective relay characteristics

| Characteristic | Operating Input | Phase Comparator $S_1 S_2 \cos(\pm\theta \pm \lambda \pm \pi/\lambda) > 0$ | | | | Amplitude Comparator $T_1 > T_2$ | | |
|---|---|---|---|---|---|---|---|---|
| | | Fig. No. $S_1$ | Polarising Input $S_2$ | Fig. No. $S_2$ | Operating Input $T_1$ | Fig. No. $T_1$ | Restraining Input $T_2$ | Fig. No. $T_2$ |
| Directional (1) | $(I_A - I_L)Z_{R1}$ | 3 | $(V_A - I_L Z_{R2})$ | 4 | $\|K_1[(I_A - 2I_L)Z_{R1} + V_A]\|$ | 7 | $\|(I_A Z_{R1} - V_A)\|$ | 6 |
| Directional (2) | $(I_A - I_L)Z_{R1}$ | 3 | $(V_A - I_L Z_{R2})$ | 5 | $\|K_1[(I_A - 2I_L)Z_{R1} + V_A]\|$ | 10 | $\|(I_A Z_{R1} - V_A)\|$ | 13 |
| Angle Impedance (Ohm) | $(V_A - I_A Z_{R1})$ | 6 | $(I_A - I_L)Z_{R2}$ | 3 | $\|K_1[(2I_A - I_L)Z_{R1} - V_A]\|$ | 14 | $\|(V_A - I_L Z_{R1})\|$ | 4 |
| Impedance (1) | $(V_A - I_A Z_{R1})$ | 6 | $V_A + (I_A - 2I_L)Z_{R2}$ | 9 | $\|K_1[(I_A - I_L)Z_{R1}]\|$ | 3 | $\|V_A + I_A Z_{R1} K_3 < \alpha - I_L Z_{R1} K_2 < \beta\|$ | 26 |
| Impedance (2) | $(V_A - I_A Z_{R1})$ | 6 | $V_A + (I_A - 2I_L)Z_{R2}$ | 10 | | | | |
| Angle Admittance (Mho) (1) | $(V_A - I_A Z_{R1})$ | 6 | $(V_A - I_L Z_{R2})$ | 4 | $\|K_1(I_A - I_L)Z_{R1}\|$ | 3 | $\|2V_A - (K_1 < \alpha I_A + K_2 < \beta I_L)Z_{R1}\|$ | 27 |
| Angle Admittance (Mho) (2) | $(V_A - I_A Z_{R1})$ | 6 | $(V_A' - I_L Z_{R2})$ | 5 | | | | |
| Offset Mho (1) | $(V_A - I_A Z_{R1})$ | 6 | $V_A - \left[I_A - I_L \dfrac{(Z_O - Z_{R2})}{Z_O}\right]Z_O$ | 11 | $\|K_1(I_A - I_L)(Z_{R1} - Z_O)\|$ | 20 | $\|2V_A - I_A(K_1 < \alpha Z_{R1} + K_2 < \beta(Z_O - Z_{R1}) + I_L K_2 < \beta(Z_O - Z_{R1})\|$ | 28 |
| Offset Mho (2) | $(V_A - I_A Z_{R1})$ | 6 | $V_A' - \left[I_A - I_L \dfrac{(Z_O - Z_{R2})}{Z_O}\right]Z_O$ | 12 | | | | |

$K_1 < \beta = (2 - K_1 < \alpha)$ and $K_3 < \alpha = (1 - K_1 < \alpha)$

Figure 29:
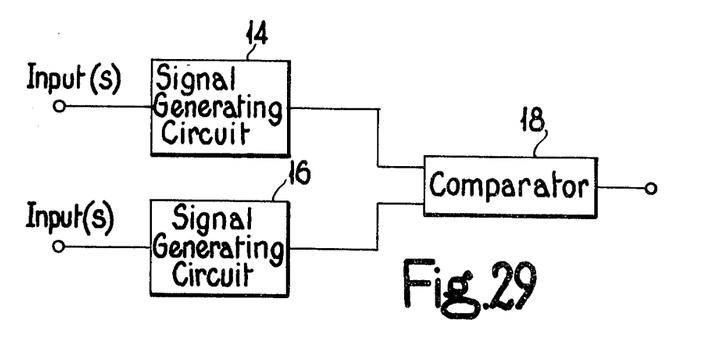
FIG. 29 is a schematic diagram illustrating the basic form of such a protective relay arrangement.

Referring to FIG. 29, a protective relay arrangement in accordance with the invention, for detecting faults in a single phase network or a polyphase network under balanced conditions essentially comprises circuits 14 and 16 for generating from quantities available at the relaying point the signals which are required to be compared to obtain a desired characteristic for the relay, as indicated in Tables II and III, and an amplitude or phase comparator 18 for detecting when the amplitude or phase relation between the outputs of the circuits 14 and 16 attains a predetermined value.

The comparator 18 may be of any of the forms conventionally used in protective relay arrangements. See for example U.S. Pat. No. 3,524,200 issued to W. D. Humpage and S. Manickavasagar on the Aug. 17, 1970 which describes a phase comparator and U.S. Pat. No. 3,340,435 issued to H. Hoel on the Sept. 5, 1967 which describes an amplitude comparator.

It will be understood that a typical A.C. power system protective relay equipment will comprise a number of arrangements as shown in FIG. 29, see, for example, U.S. Pat. No. 3,378,728 issued to W. D. Humpage and S. P. Sabberwal on the Apr. 16, 1968; U.S. Pat. No. 3,379,934 issued to H. Hoel and W. D. Humpage on the Apr. 23, 1968 and U.S. Pat. No. 3,413,523 issued to H. Hoel on the Nov. 26, 1968.

In FIGS. 3 to 28 there are shown suitable forms of the circuits for producing the various comparator input voltages given in Tables II and III. In Tables II and III the number in the column to the right of each voltage gives the number of the Figure showing a circuit for producing that voltage.

Referring to FIGS. 3 to 28, each of the circuits comprises a different combination of various basic components namely; a current transformer 10; a voltage transformer 12; a variable impedance set to an appropriate value $Z_{R1}$, $Z_{R2}$, $Z_0$, $X_{R1}$, $X_{R2}$, $X_0$, or a multiple or combination thereof, as required; a voltage divider comprising a pair of equal value resistors $R_1$ connected in series; a resonant circuit comprising an inductor $L_1$ in parallel with a capacitor $C_1$; and a resistor $R_0$ connected in series with the resonant circuit and having a value equal to the dynamic impedance of the resonant circuit at the supply frequency.

The inputs to the circuits are the phase current at the relaying point, and when required, the phase voltage at the relaying point, so that the circuit input under fault conditions is either $I_A$ or $I_A$ and $V_A$, as shown in FIGS. 3 to 28.

The input $I_A$ is applied to the primary of one or more current transformers 10 and the resulting current proportional to $I_A$ which appears in the secondary is applied across one or more appropriately set variable impedances to produce required components of the output voltage dependent on $I_A$.

Figure 6:
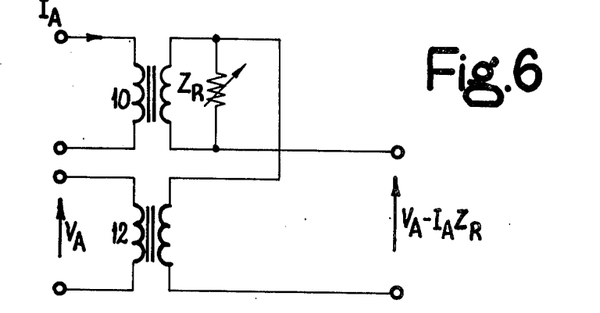
Figure 7:
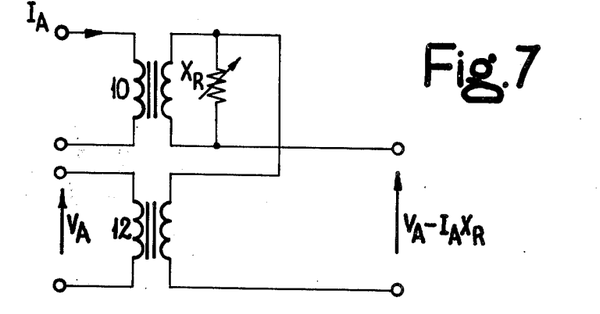
Figure 8:
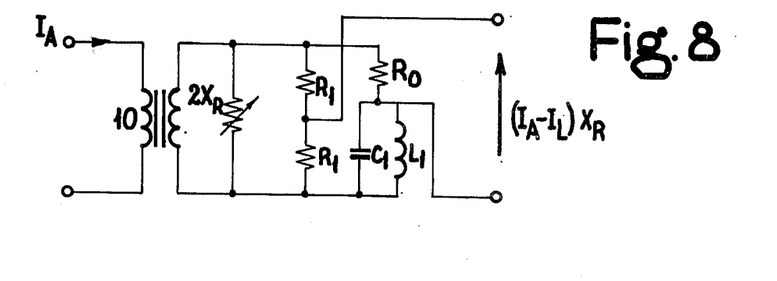

For example, as shown in FIG. 6, a variable impedance set to $Z_R$ is connected across the secondary of current transformer 10 to produce an output voltage component $I_A Z_R$.

It will be appreciated that the variable impedances referenced $Z_R$ and $X_R$, without a numerical suffix, in FIGS. 3 to 28 are in practice set to a particular value $Z_{R1}$, $Z_{R2}$, $X_{R1}$ or $X_{R2}$, as appropriate to the required output voltage.

Output voltage components proportional to $V_A$ are similarly produced across the secondary of a voltage transformer 12 to whose primary the input $V_A$ is applied.

The various voltage components are added or subtracted, as required, to produce the required output voltages. Thus, in FIG. 6 the voltage component $I_A Z_R$ produced across the variable impedance is subtracted from the voltage across the secondary of voltage transformer 12 to produce the required output voltage $V_A - I_A Z_R$.

It will be appreciated that in this description and FIGS. 3 to 28 constants of proportionality are omitted for simplicity.

Where output voltage components dependent on the pre-fault phase voltage $I_L$ or the pre-fault phase voltage $V_A'$ are required, use is made of a resonant circuit $C_1$ and $L_1$ and an associated resistor $R_0$. Due to the response time of a resonant circuit, when the voltage across the series connection of a resistor $R_0$ and a resonant circuit $L_1 C_1$ changes, the voltage across the resonant circuit remains, briefly, substantially at the value before the change.

Figure 4:
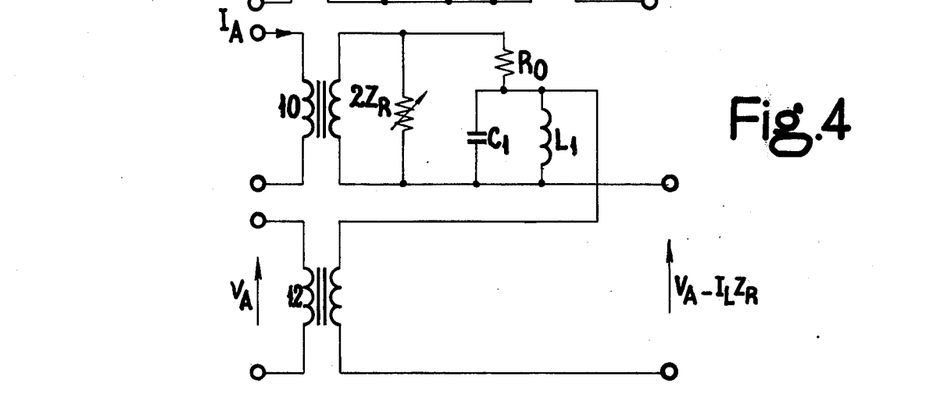
Figure 5:
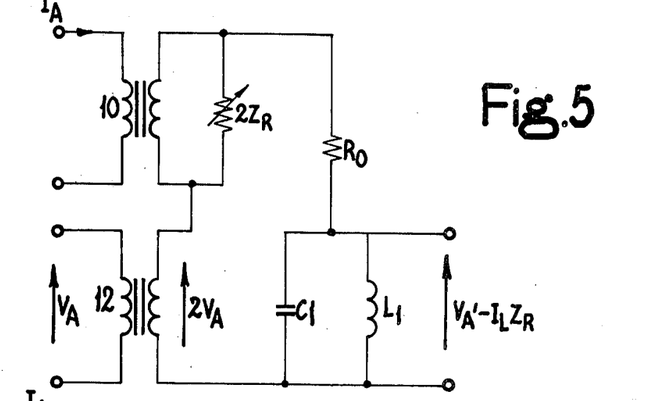
Figure 14:
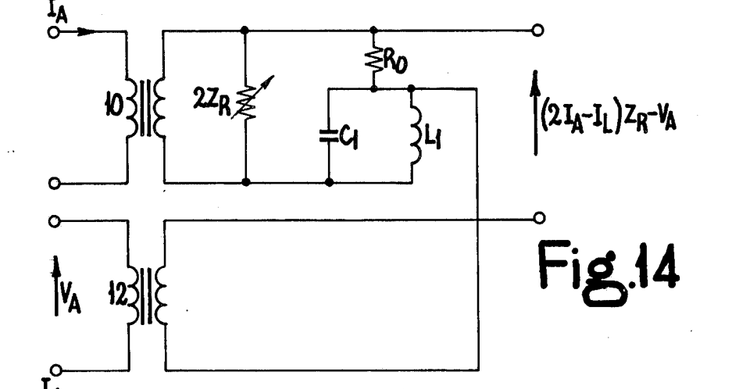
Figure 15:
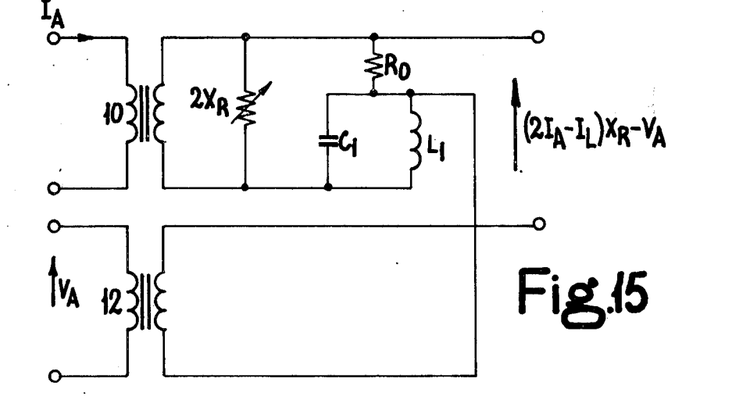
Figure 16:
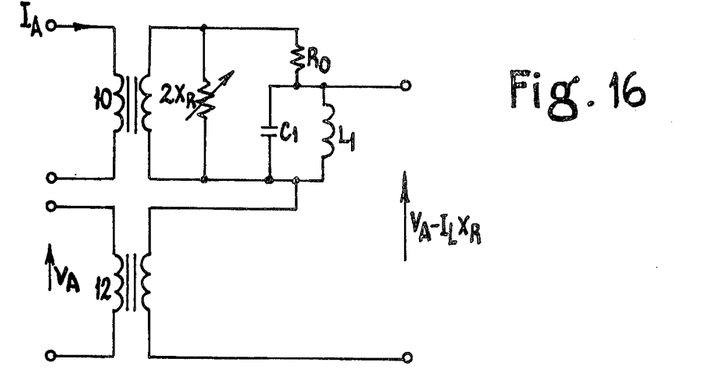

For example, in the circuit of FIG. 4 a voltage $I_L Z_R$ remains briefly across the resonant circuit $L_1 C_1$ after a fault has occurred which is subtracted from the voltage across the secondary of voltage transformer 12 to give a voltage of $V_A - I_L Z_R$ at the output of the circuit. Similarly in the circuit of FIG. 5, the required output voltage $V_A' - I_L Z_R$ remains briefly across the resonant circuit $L_1 C_1$ after a fault occurs. In the circuit of FIG. 14 a voltage $I_L Z_R$ appears briefly across the resonant circuit $L_1 C_1$ after a fault so that the voltage across resistor $R_0$ is the voltage across the impedance $2Z_R$ minus the voltage across $L_1 C_1$, that is $2I_A Z_R - I_L Z_R$, the voltage $V_A$ across the secondary of voltage transformer being subtracted from the voltage across resistor $R_0$ to produce an output voltage of $(2I_A - I_L) Z_R - V_A$.

The resonant circuits in FIGS. 3 to 28 are preferably provided with automatic tuning arrangements to keep them at resonance despite changes in the supply frequency.

Where an output voltage component dependent on $I_A - I_L$ is required, use is made of a four arm bridge network having resistor $R_0$ and resonant circuit $L_1 C_1$ as the two arms of one branch and a pair of resistors $R_1$ as the two arms of the other branch. An appropriate voltage is applied in common to the two branches and the required output is derived from between the junction of the resistors $R_1$ and the junction between the resistor $R_0$ and the resonant circuit. Under steady conditions the output of the bridge is clearly zero, but when the voltage applied to the bridge changes the voltage at the junction of the resistors changes correspondingly while the voltage at the junction of the resistor $R_0$ and the resonant circuit remains briefly at the pre-change value due to the slow response of the resonant circuit, as described above. The output of the bridge thus briefly has a value representative of the difference of the inputs before and after the change.

Figure 3:
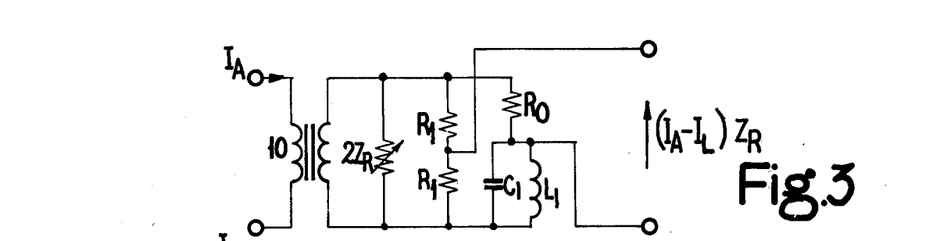
FIGS. 3 to 28 are circuit diagrams of arrangements for producing input signals required for various protective relay arrangements for the power system shown in FIGS. 1 and 2.

One example of this is in FIG. 3 where the voltage $2I_A Z_R$ across the impedance $2Z_R$ connected across the secondary of current transformer 10 is applied across the two branches of the bridge to give $(I_A - I_L) Z_R$ at the output.

Figure 17:
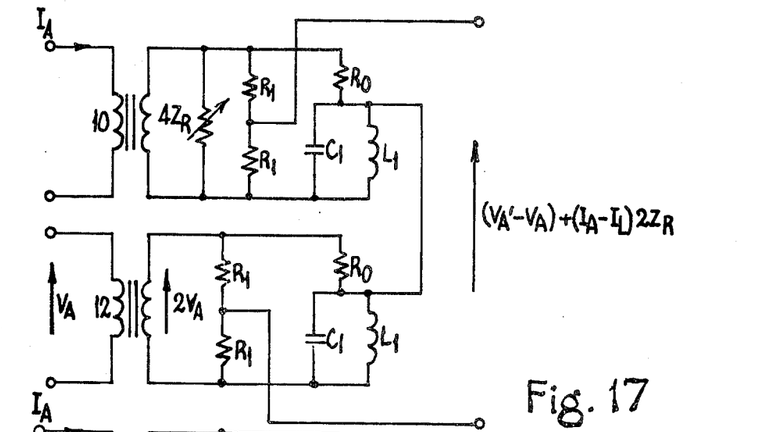
Figure 18:
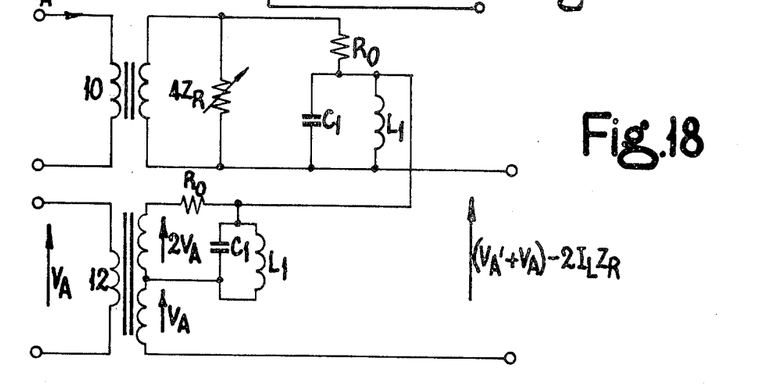
Figure 19:
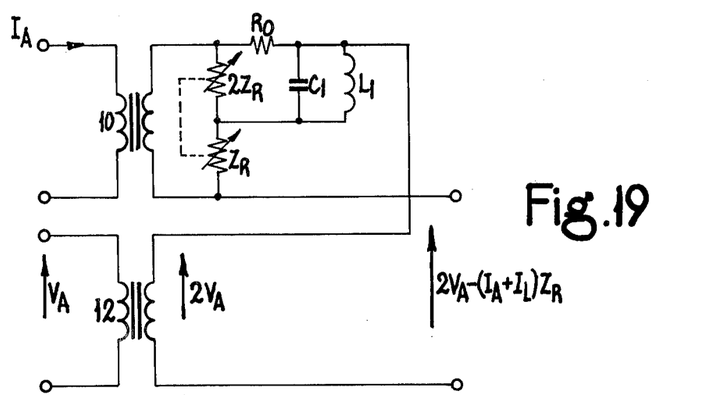
Figure 20:
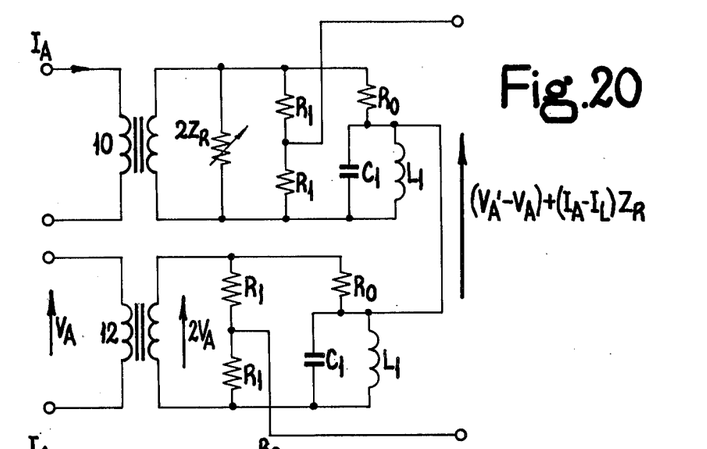
Figure 21:
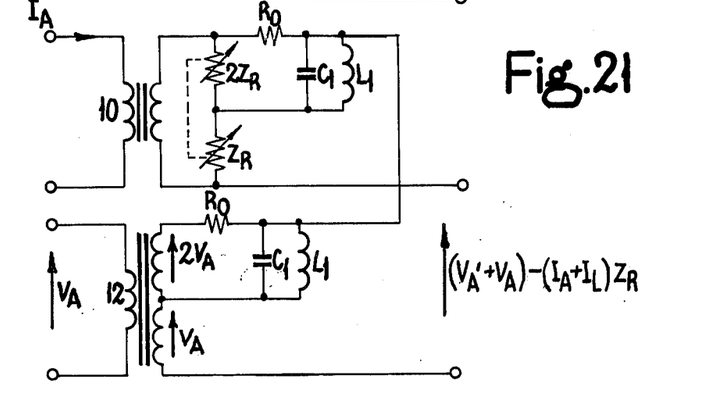
Figure 22:
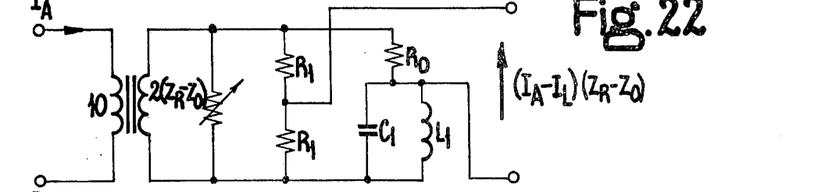
Figure 23:
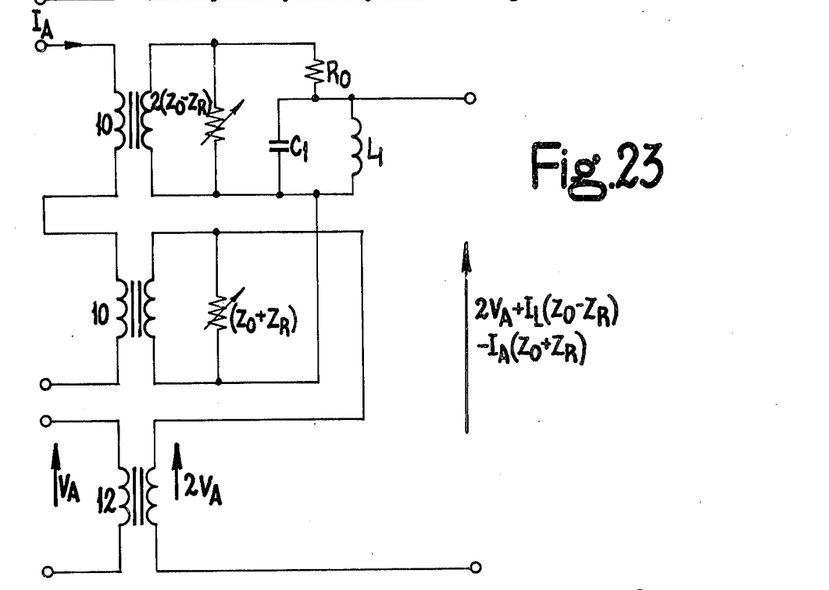
Figure 24:
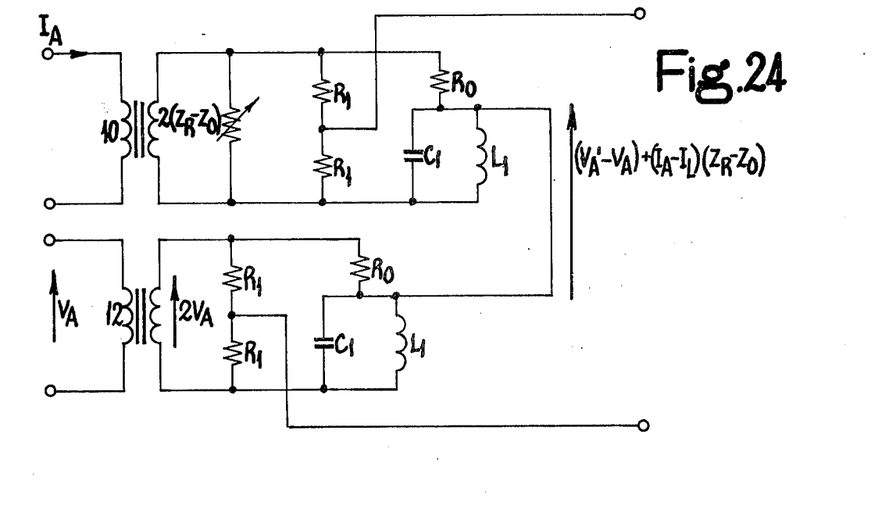
Figure 25:
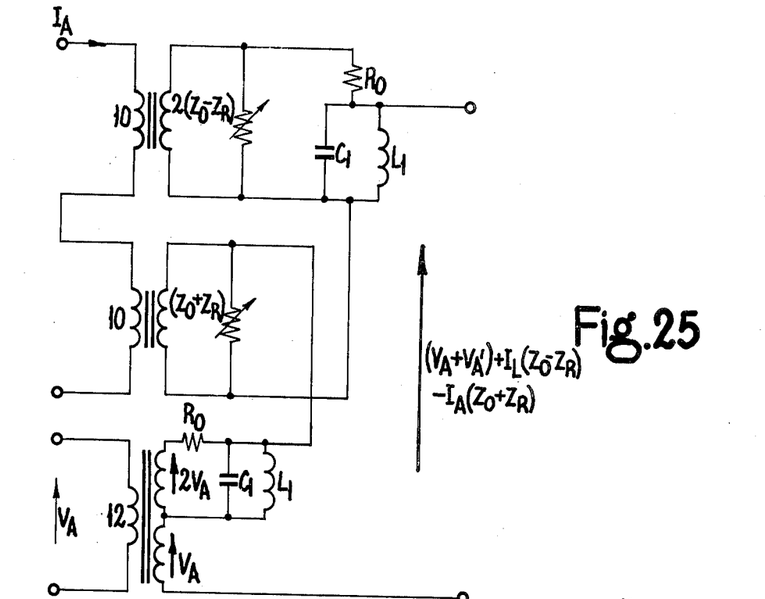

An output voltage component dependent on $V_A' - V_A$ is similarly derived by use of such a bridge network, as shown, for example, in FIGS. 17 and 20.

Figure 9:
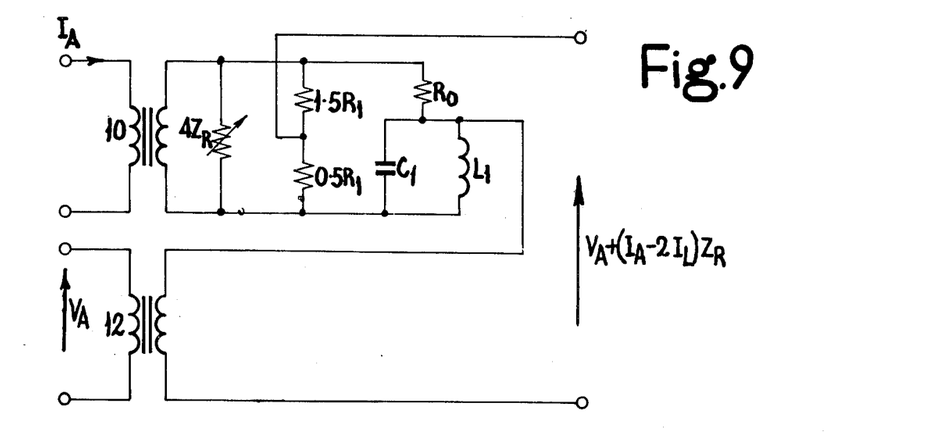
Figure 10:
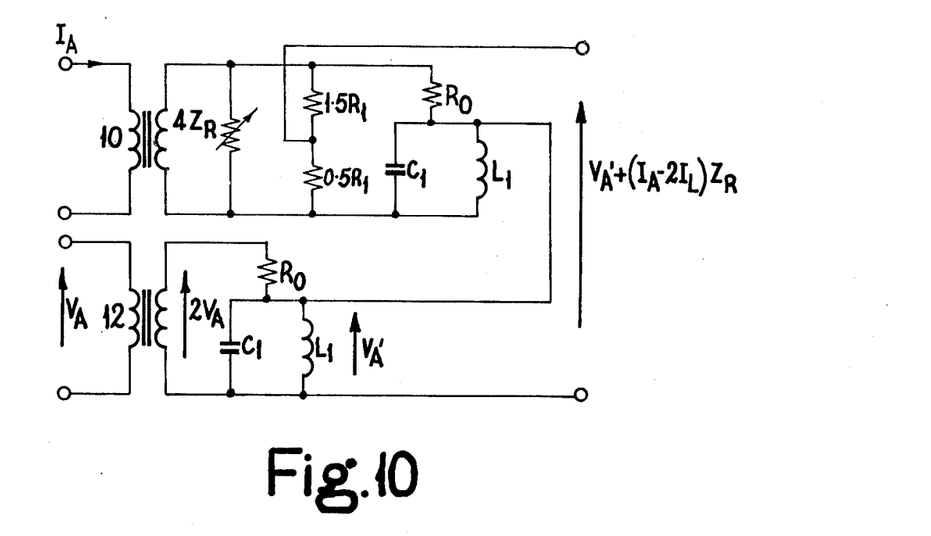
Figure 11:
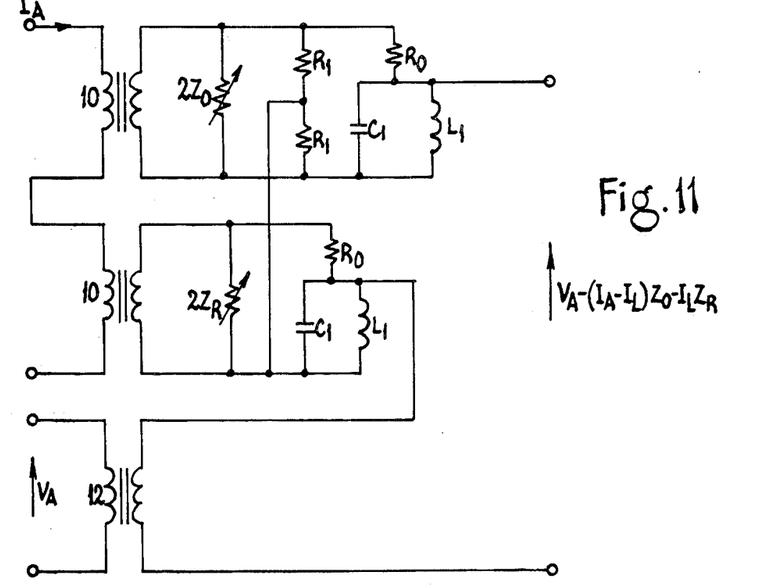
Figure 12:
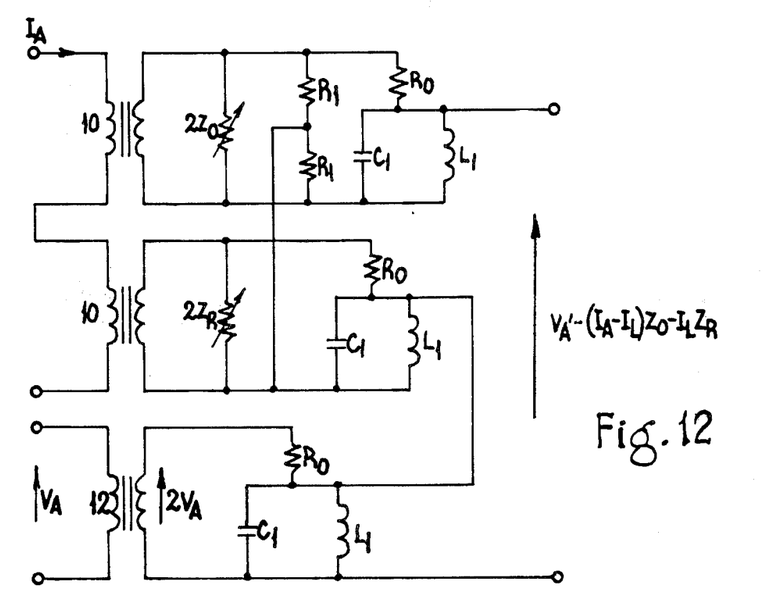
Figure 13:
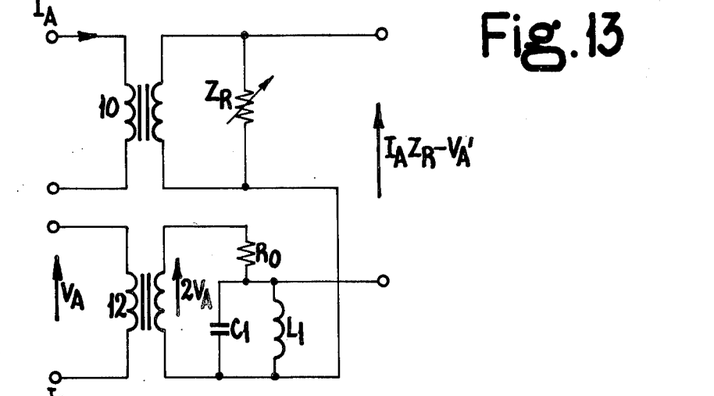

Output voltage components dependent on $I_A - 2I_L$ are similarly derived by a bridge network with resistors of value 1.5 $R_1$ and 0.5 $R_1$ in the resistive branch instead of equal valued resistors, as shown for example, in FIGS. 9 and 10.

Figure 26:
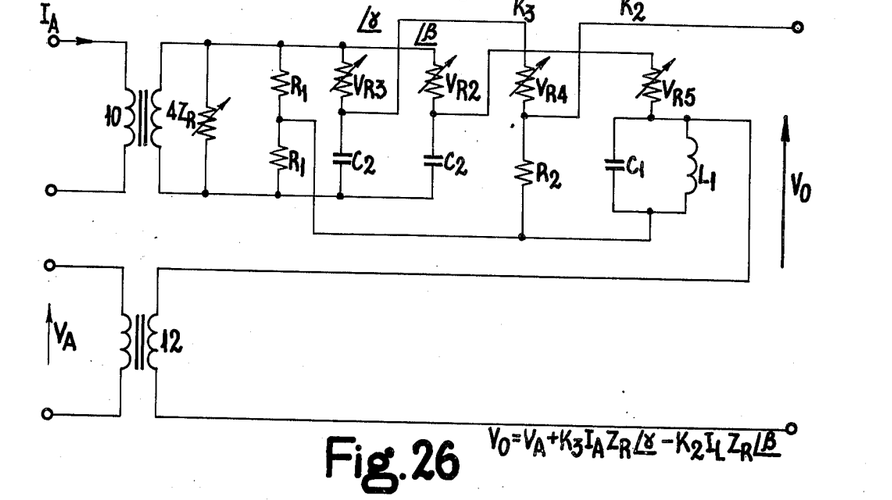
Figure 27:
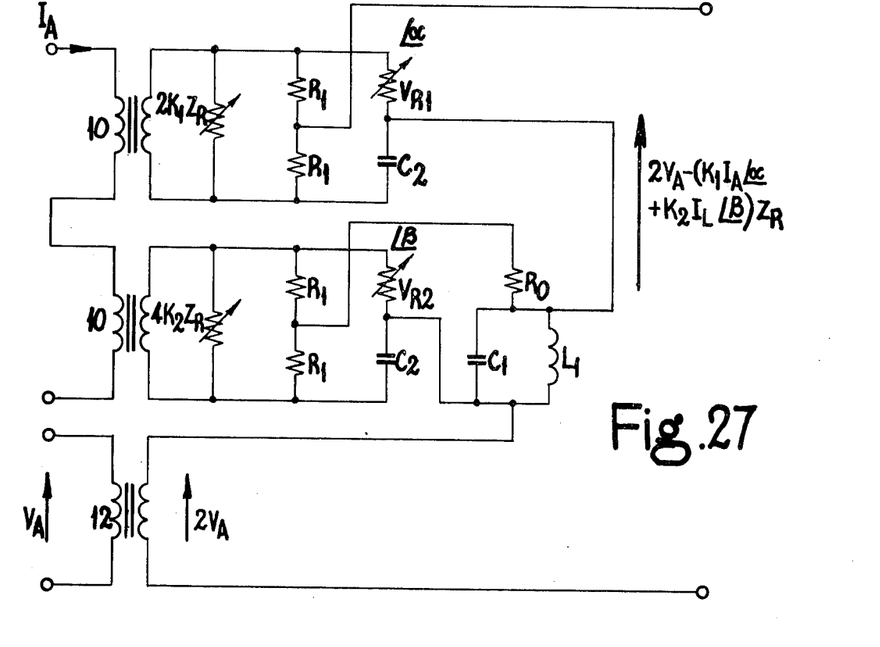
Figure 28:
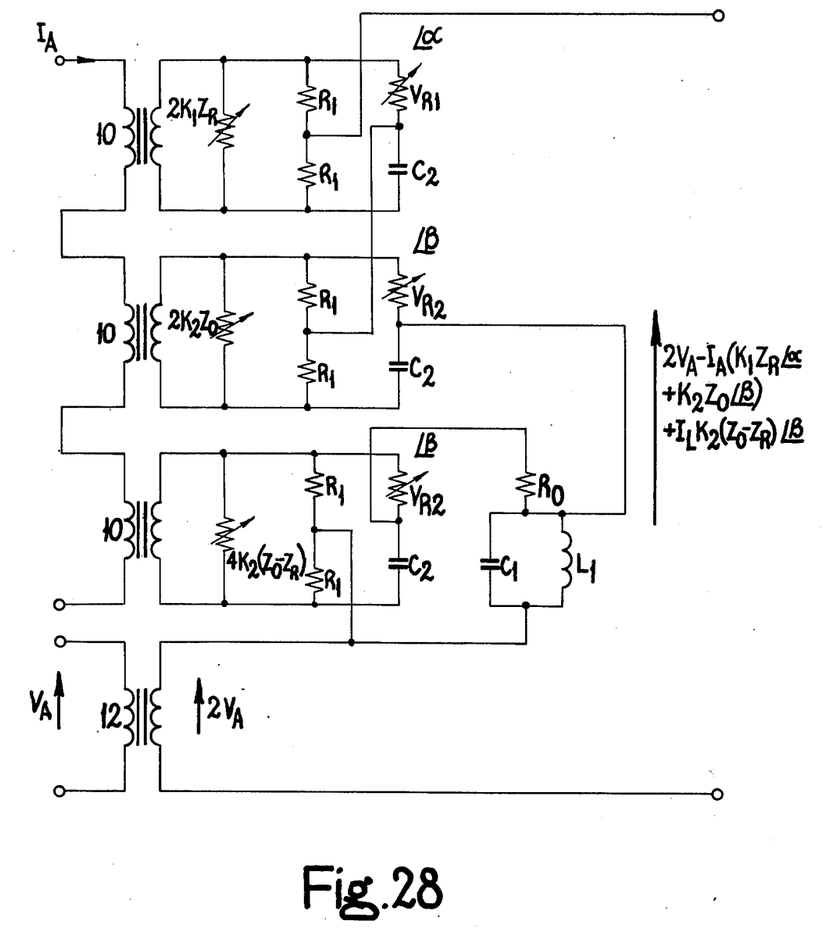

In the circuits of FIGS. 26, 27 and 28 for the more complex restricted characteristic amplitude comparator inputs shown in Table III, the constants $K_1$, $K_2$ and $K_3$ and phase shifts $\angle\alpha$, $\angle\beta$ and $\angle\gamma$ are introduced as follows:

For the phase shifts use is made of a four arm bridge network having equal valued resistors $R_1$ as the two arms of one branch and a variable resistor $V_R$ and a capacitor $C_2$ as the two arms of the other branch. The voltage to be phase shifted is applied in common to the two branches and an output is derived from the junction between the two resistors $R_1$ and the junction between capacitor $C_2$ and variable resistor $V_R$, $V_R$ being set to a value $V_{R1}$, $V_{R2}$ or $V_{R3}$ to give the required phase shift $\angle\alpha$, $\angle\beta$ or $\angle\gamma$.

The constants are introduced in FIGS. 27 and 28 by appropriate choice of the impedances connected across the current transformers 10, and in FIG. 26, by use of a voltage divider comprising a variable resistor $V_{R4}$ in series with a resistor $R_2$, and by a variable resistor $V_{R5}$ in series with the resonant circuit $L_1 C_2$.

In the simpler restricted characteristic amplitude comparator inputs, the constants are obtained by means of a voltage divider across the output of the appropriate one of the circuits of FIGS. 3 to 28.

It will be appreciated that the directional and angle admittance characteristic phase comparator protective relay arrangements considered in Tables II and III, sound phase voltage or sound phase-to-phase voltage may be used in place of $V_A$ in the polarising inputs, if desired.

By suitably combining the above described directional, angle impedance and reactance characteristic arrangements in accordance with known principles, triangular and quadrilateral characteristic arrangements in accordance with the invention may be produced.

It will be understood that while all the arrangements described above are for single phase networks or polyphase networks under balanced conditions, the present invention can be applied to arrangements for polyphase networks under unbalanced conditions by appropriately modifying the input voltages in known manner. For example, in the case of an earth fault protective relay arrangement the current $I_A$ will have a compensating term $KI_{res}$ added so that in the expressions given in Tables II and III the term $I_A$ becomes $I_A'$ where $$I_A' = I_A + KI_{res}$$

where $$K = (Z_{L0} - Z_{L1})/3Z_{L1}$$

$Z_{L0}$ is the zero-sequence component of $Z_L$;
$Z_{L1}$ is the positive-sequence component of $Z_L$; and
$I_{res}$ is the residual current at the relaying point.

Similarly, the present invention can be applied to phase-fault relay arrangements by replacing the phase voltage $V_A$ and the phase current $I_A$ in the expressions in Table II and III by the appropriate phase-to-phase voltages and phase difference currents respectively. For example, in the case of a phase-fault protective relay arrangement for phases A and B, the voltage $V_{AB}$ between phase A and B is used in place of $V_A$ and the difference current $I_A - I_B$ between phases A and B is used in place of $I_A$.

In the appended claims, the symbols $Z_{R1}$, $Z_{R2}$, $Z_0$, $X_{R1}$, and $X_{R2}$ represent the same quantities as in the foregoing specification.

We claim:

1. A protective relay arrangement for an A.C. power system comprising: circuit means for deriving at least one pair of signals which, when a fault occurs in the system, are functions of quantities which would have occurred in the system at the relaying point under fault conditions if the or each emf source in the system had a value equal to the pre-fault voltage at the point in the system where the fault has occurred; and comparator means for comparing said signals.

2. A protective relay arrangement according to claim 1 wherein each said signal is a function of at least one of a current $I_{AF}$ and a voltage $V_{AF}$ given by the expressions:

$$I_{AF} = I_A - I_L \text{ and}$$

$$V_{AF} = V_A - I_L Z_R$$

where:
$I_A$ is a current at the relaying point under fault conditions;
$I_L$ is a pre-fault current at the relaying point;
$V_A$ is a voltage at the relaying point; and
$Z_R$ is an impedance replica of an impedance of a line section of the power system protected by the relay arrangement.

3. A protective relay arrangement according to claim 2 exhibiting a directional characteristic wherein said comparator means is a phase comparator and said circuit means provides the comparator means with inputs of the form $I_{AF} Z_{R1}$ and $V_{AF}$.

4. A protective relay arrangement according to claim 2 exhibiting a directional characteristic wherein said comparator means is an amplitude comparator and said circuit means provides the comparator means with inputs of the form $|I_{AF} Z_{R1} + V_{AF}|$ and $|I_{AF} Z_{R1} - V_{AF}|$.

5. A protective relay arrangement according to claim 2 exhibiting an angle impedance characteristic wherein said comparator means is a phase comparator and said circuit means provides the comparator means with inputs of the form $V_{AF} - I_{AF} Z_{R1}$ and $I_{AF} Z_{R2}$.

6. A protective relay arrangement according to claim 2 exhibiting an angle impedance characteristic wherein said comparator means is an amplitude comparator and said circuit means provides the comparator means with inputs of the form $|2I_{AF} Z_{R1} - V_{AF}|$ and $|V_{AF}|$.

7. A protective relay arrangement according to claim 2 exhibiting a reactance characteristic wherein said comparator means is a phase comparator and said circuit means provides the comparator means with inputs of the form $V_{AF} - I_{AF} X_{R1}$ and $I_{AF} X_{R2}$.

8. A protective relay arrangement according to claim 2 exhibiting a reactance characteristic wherein said comparator means is a phase comparator and said circuit means provides the comparator means with inputs of the form $|2I_{AF} X_{R1} - V_{AF}|$ and $|V_{AF}|$.

9. A protective relay arrangement according to claim 2 exhibiting an impedance characteristic wherein said comparator means is a phase comparator and said circuit means provides the comparator means with inputs of the form $V_{AF} - I_{AF} Z_{R1}$ and $I_{AF} Z_{R2} + V_{AF}$.

10. A protective relay arrangement according to claim 2 exhibiting an impedance characteristc wherein said comparator means is an amplitude comparator and said circuit means provides the comparator means with inputs of the form $|I_{AF}Z_{R1}|$ and $|V_{AF}|$.

11. A protective relay arrangement according to claim 2 exhibiting an angle admittance characteristic wherein said comparator means is a phase comparator and said circuit means provides the comparator means with inputs of the form $V_{AF} - I_{AF}Z_{R1}$ and $V_{AF}$.

12. A protective relay arrangement according to claim 2 exhibiting an angle admittance characteristic wherein said comparator means is an amplitude comparator and said circuit means provides said comparator means with inputs of the form $|I_{AF}Z_{R1}|$ and $|2V_{AF} - I_{AF}Z_{R1}|$.

13. A protective relay arrangement according to claim 2 exhibiting an offset mho characteristic wherein said comparator means is a phase comparator and said circuit means provides the comparator means with inputs of the form $V_{AF} - I_{AF}Z_{R1}$ and $V_{AF} - I_{AF}Z_{R2}$.

14. A protective relay arrangement according to claim 2 exhibiting an offset mho characteristic wherein said comparator means is an amplitude comparator and said circuit means provides the comparator means with inputs of the form $|I_{AF}(Z_{R1} - Z_0)|$ and $|2V_{AF} - I_{AF}(Z_{R1} - Z_0)|$.

15. A protective relay arrangement according to claim 3 wherein said circuit means provides the comparator means with inputs of the form $(I_A - I_L)Z_{R1}$ and $V_A' - I_LZ_{R2}$ where $V_A'$ is a pre-fault voltage at the relaying point.

16. A protective relay arrangement according to claim 4 wherein said circuit means provides the comparator means with inputs of the form $|(I_A - 2I_L)Z_{R1} + V_A'|$ and $|I_AZ_{R1} - V_A'|$ where $V_A'$ is a pre-fault voltage at the relaying point.

17. A protective relay arrangement according to claim 11 wherein said circuit means provides the comparator means with inputs of the form $V_A - I_AZ_{R1}$ and $V_A' - I_LZ_{R2}$ where $V_A$ is a voltage at the relaying point under fault conditions and $V_A'$ is a pre-fault voltage at the relaying point.

18. A protective relay arrangement according to claim 12 wherein said circuit means provides the comparator means with inputs of the form $|(V_A' - V_A) + (I_A - I_L)Z_{R1}|$ and $|V_A + V_A' - (I_A + I_L)Z_{R1}|$ where $V_A$ is a voltage at the relaying point under fault conditions and $V_A'$ is a pre-fault voltage at the relaying point.

* * * * *